Dec. 11, 1928.

H. WEICHSEL 1,694,460

ALTERNATING CURRENT MOTOR

Filed July 11, 1925

INVENTOR
Hans Weichsel
BY E.E.Huffman
ATTORNEY

Patented Dec. 11, 1928.

1,694,460

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed July 11, 1925. Serial No. 42,867.

My invention relates to an alternating current motor of the synchronous type, and particularly to means and method for starting such machines without the use of a starting resistance. By my invention the starting of the machine is also accomplished without an excessive current draw from the line at any stage.

Figure 1:
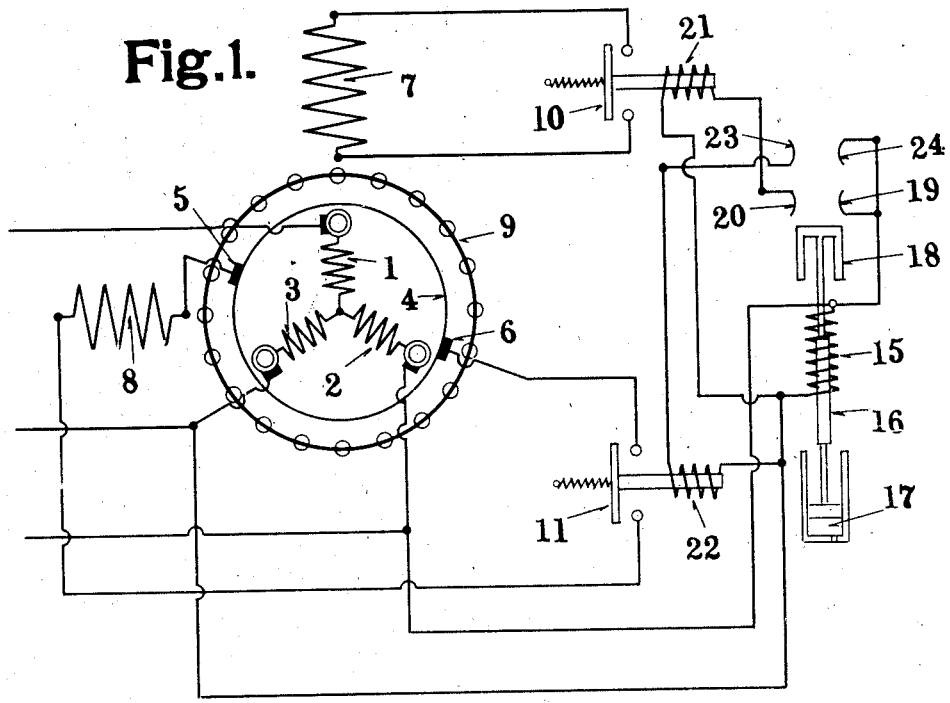
Figure 2:
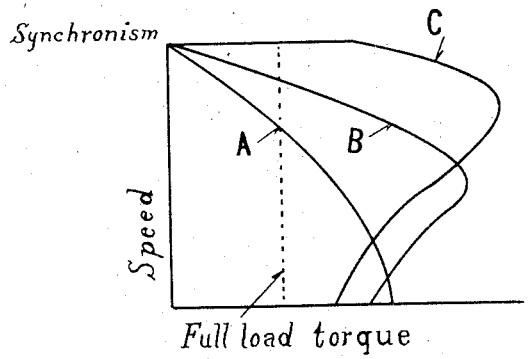

In the accompanying drawings Figure 1 illustrates a motor embodying my invention, and Figure 2 is a diagram showing the approximate speed torque curves of the machine in the different stages of the starting operation.

The inducing member of the machine is provided with polyphase windings 1, 2, 3 connected to the line by means of slip rings, as shown, and with a commuted winding 4 with which brushes 5, 6 cooperate. The induced member is provided with a permanently short circulated relatively high resistance winding 9, which is preferably in the form of a squirrel-cage, and with an auxiliary secondary winding 7. The induced member also carries an exciting winding 8 adapted to be placed in circuit with the brushes 5, 6 during the last step of the starting operation and to continue in such circuit during normal operation of the machine.

Switch 10 is for the purpose of short circuiting the winding 7, and switch 11 for connecting the exciting winding in circuit with the commuted winding. These switches are operated by the solenoids 21 and 22 respectively, which solenoids are successively connected in circuit with the line by means of the solenoid and dash-pot controlled switch member 18, which, in its initial movement, connects contacts 19 and 20 and places the solenoid 21 in circuit with the line whereby switch 10 is drawn into closed position and winding 7 short circuited. Further movement of the switch member 18 connects the contacts 23 and 24 and connects solenoid 22 in circuit with the line whereby switch 11 is closed and the exciting winding 8 connected in circuit with the commuted winding 4. In this final position of the switch member 18 the circuit through the solenoid 21 is kept closed. Switch member 18 is actuated by the solenoid 15 supplied with line current as shown, and the motion of its armature 16 is controlled by the dash-pot 17 in such manner that the desired time will elapse between the closing of the circuit of solenoid 21 and that of solenoid 22.

When it is desired to start the machine described, the line switch (not shown) is merely closed and current is supplied to polyphase windings 1, 2, 3, whereupon this winding co-operates with the high resistance squirrel-cage winding 9 to produce a starting torque. For reasons well understood, this torque decreases as the speed rises and the speed torque curve obtained with the winding 9 only will be substantially as indicated by the line A in Figure 2.

As soon as line current is supplied to the inducing winding current is also supplied to the solenoid 15 and the switch member 18 begins to move toward its closed position, the motion being retarded by the dash-pot 17. The dash-pot is so adjusted that switch member 18 connects contacts 19 and 20 and causes switch 10 to be closed and short circuit the winding 7 at a suitable interval after the line switch has been closed, and an additional secondary circuit being thereby made operative, the machine is given a speed torque characteristic substantially as illustrated by the line B in Figure 2 and the current draw from the line is only moderately increased. The motion of the switch member 18 continues, and the position of contacts 22 and 23 with respect to contacts 19 and 20 is so selected with reference to the rate of motion of the switch member 18 that at a suitable interval after the closing of the switch 10 contacts 23 and 24 will be connected by the switch member 18, and switch 11 will be closed, thus placing exciting winding 8 in circuit with the commuted winding 4 and further increasing the torque to bring the machine into synchronous speed. The speed torque curve of the machine, under the final position of the switch member 18, will be as indicated by the line C in Figure 2.

As explained in my Patent No. 1,532,287, the winding 8 not only acts as a secondary winding when it is connected during the starting period as described, but also by its conductive cooperation with the commuted winding when the brushes are not much displaced from the axis of the winding 8, gives the machine a pull-in torque which, as shown by Figure 2, is in excess of the full load torque.

While I have illustrated one means for automatically closing the circuits of the windings on the secondary member successively and at suitable periods in the starting operation, it will be understood that equivalent means for this purpose may be employed and that I do not intend that the scope of my invention be limited other than as set forth in the appended claim.

Having fully described my invention, what I claim as new and desire to secure by Letters Patent of the United States is:

In an alternating current motor, the combination of an inducing member having an inducing winding and a commuted winding, an induced member provided with an exciting winding, a high resistance closed circuited winding and with an auxiliary single phase secondary winding, means for closing the circuit of the auxiliary secondary winding at a speed below synchronous speed, and means for connecting the exciting winding in circuit with the commuted winding at a speed above said last mentioned speed but below synchronous speed.

In testimony whereof, I have hereunto set my hand this 8th day of July, 1925.

HANS WEICHSEL.